J. W. HOOLEY

SUPPORTING AND INSULATING CONNECTION FOR ELECTRIC CONDUCTORS

2 Sheets-Sheet 1

June 27, 1933. Original Filed May 18, 1931 Re. 18,880

Inventor
John W. Hooley
by A. W. Harrison
Attorney

J. W. HOOLEY

SUPPORTING AND INSULATING CONNECTION FOR ELECTRIC CONDUCTORS

2 Sheets-Sheet 2

June 27, 1933. Original Filed May 18, 1931 Re. 18,880

Inventor
John W. Hooley
by N. H. Harrison
Attorney

Reissued June 27, 1933

Re. 18,880

UNITED STATES PATENT OFFICE

JOHN W. HOOLEY, OF LARCHMONT, NEW YORK, ASSIGNOR TO HIXLEY ELECTRIC COMPANY, OF NEW YORK, N. Y., A CORPORATION OF NEW YORK

SUPPORTING AND INSULATING CONNECTION FOR ELECTRIC CONDUCTORS

Original No. 1,838,516, dated December 29, 1931, Serial No. 538,329, filed May 18, 1931. Application for reissue filed April 10, 1933. Serial No. 665,465.

This invention relates generally to boxes or cabinets for the accommodation and reception of panel boards, distributing boards, switch boards, interconnection boxes for signal systems such as telephones, bells, and any members or devices that may be used for distributing light and power, wiring connections, or wires or conductors. And the invention relates more particularly to an improved form of combined support for the conductors or cables and connection between the cable and bus-bar or other cable.

At present, those interested in electrical work such as electrical engineers, manufacturers and underwriters, limit the number of conductors in conduits, and such conductors are so limited until they enter a panel or connection box, or so-called pull box or junction box. Then the conductors are generally crossed and run in haphazard manner in order to make connections to the circuit protecting or other devices in the panel cabinet.

An improved multiple circuit electrical distributing device for use in overcoming objections and difficulties encountered in making such installations as referred to, is described and claimed in Letters Patent No. 1,796,521 issued to me March 17, 1931, and improvements therein are described and claimed in Letters Patent No. 1,838,515 issued to me December 29, 1931 upon my application filed March 12, 1931, Serial No. 521,949, of which application the present one is a continuation in part.

Heretofore, so far as I am aware, the connections between the main cables and the bus bars or other conductors in cabinets containing circuit protecting or other devices, have been complicated, and require operations such as wedging, soldering, or taping. And it has been difficult to so anchor the cables as to properly sustain them and prevent the weight of the cables, or vibrations of the building, or other force, from effecting such strain as to pull the cables out of position. Such prior methods of effecting the connections of the cables are generally unsatisfactory, and produce unsightly results.

One object of my present invention is to provide electrical mechanism or devices with improved connections which so support the electric conductors that they can not slip.

With said object in view, my invention comprises the construction and combination of parts substantially as hereinafter described and claimed.

Of the accompanying drawings:—

Figure 2 represents a section on line 2—2 of Figure 1.

Figure 5:
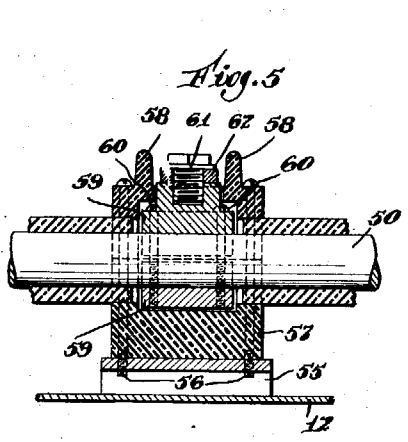
Figure 6:
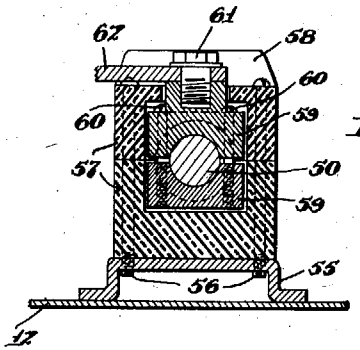
Figure 4:
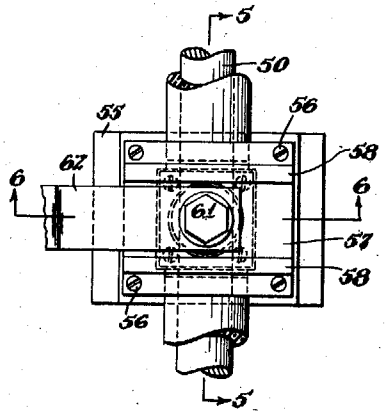
Figure 4 is a view similar to a portion of Figure 1 on a larger scale.

Figures 5 and 6 represent sections on lines 5—5 and 6—6 respectively, of Figure 4.

Similar reference characters indicate similar parts or features in all of the views.

Figure 1:
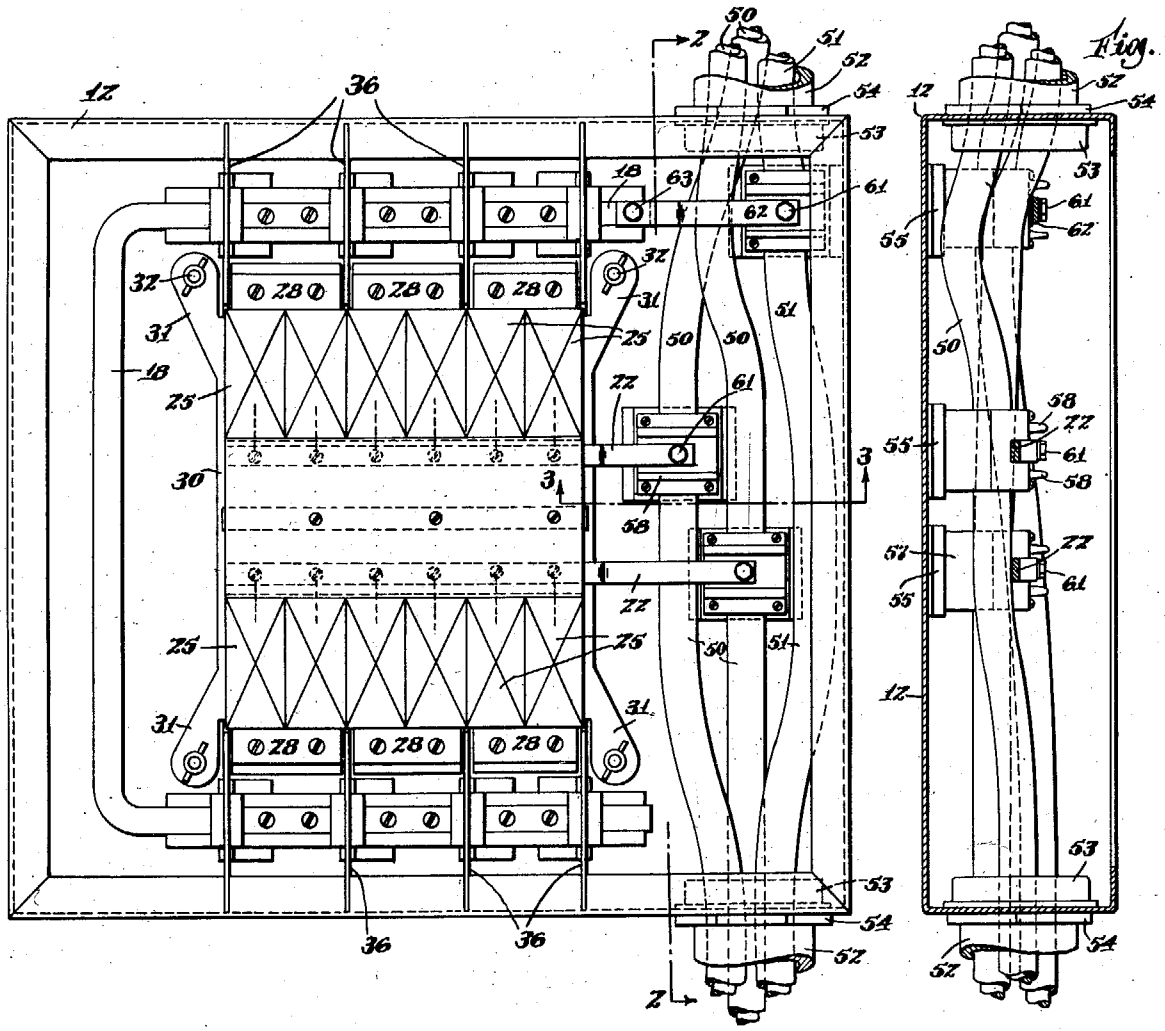
Figure 1 is a front elevation of my improved cabinet in one of its forms, the usual front door or panel thereof being omitted.

Referring first to Figure 1, the box or cabinet 12 contains a neutral bar 18, bus bars 22, circuit controlling devices indicated diagrammatically at 25, contact plates 28, a supporting plate 30 for the circuit controlling devices 25, said plate 30 having corner portions 31 through which threaded studs 32 pass to hold the plate in position, and barrier or division strips 36. As so far described, the structure is illustrated the same as in the Patent No. 1,838,515 hereinbefore referred to, the reference characters being the same as in said patent. Further description of the contents of the cabinet herein is unnecessary because the present invention relates to the conductors or main cables and the supporting connections thereof which will now be described.

At one side of the members already described, is a vertical space or raceway to accommodate the cable conductors and the supporting devices therefor. In the particular embodiment of the invention chosen for illustration herein, there are three cables two of which are designated at 50, 50, for connection to the bus bars 22 or branch lines, and the third one designated at 51 for connection to the neutral bar 18. The conduits 52 through which the cables lead to the cabinet are secured thereto as by means of bushings 53 at their inner ends inside the bottom and top walls of the cabinet, and suitable lock nuts 54 outside said walls. Each cable is illustrated as having the usual protective sheathing, which sheathing, when the cable is to be installed, is removed in the proper location to bare that portion of the core of the cable which is to be gripped by conducting members of the supporting blocks or the connection now to be described, and one of which is illustrated in detail in Figures 4, 5 and 6. A description of one will suffice for all three.

Permanently secured to the rear wall of the cabinet or other support, as by welding or otherwise, is a foot piece 55 on which is mounted, and suitably secured as by screws or bolts 56, two oppositely recessed blocks 57 of insulating material. Projecting from the top of the upper block 57 are ribs 58 the purpose of which is to prevent any cable which may cross over the connecting support, from contact with the screws 56 or the stud bolt 61 presently to be described.

Mounted in the space which exists by the presence of the recesses in the insulating blocks 57 are two blocks 59 of copper, brass, or other suitable conducting material, said blocks having screws 60 by which they are firmly held with their inner concave portions gripping the bared portion of the cable mounted therein.

Figure 3:
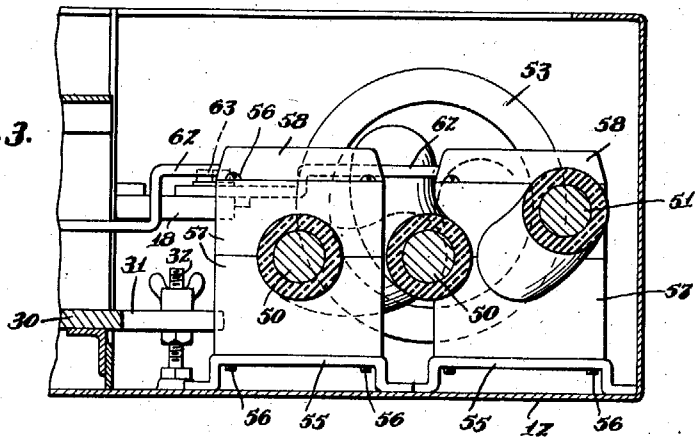
Figure 3 represents a section on line 3—3 of Figure 1, on a larger scale.

The upper block 59 has a threaded socket for a stud bolt 61 which latter passes through an aperture in one end of a connecting member, as a bar 62, the other end of which (Figs. 1 and 3) is secured by a stud bolt 63 to the end of the neutral connection or bar 18. A similar bar or strip might connect each of the two bus bars 22 with stud bolt 61, but I have chosen to illustrate, in Figure 1, that the said bus bars may have integral extensions to reach the stud bolts.

It will now be understood that I have provided a combination cable support and cable connector which is anchored securely, as by means of the metal strip or foot piece 55 which is spot welded or secured to the cabinet or other support in other approved manner, and a cabinet may come to a building with said parts already in place, and with the bus bars and other members also in place. To effect installation, the insulation on the cable is removed at the proper point, the upper block 57 and the upper block 59 are removed and after laying the cable in the cavity then replaced, the screws 60 being actuated to cause the blocks 59 to firmly grip the bared portion of the cable, and act as an anchor to hold the cable in place and also provide the necessary electrical connection. In other words, the cable is gripped directly on its copper core and is held against slippage, and the entire electrical connection consisting of the blocks 59, and bus bars &c., is securely held in place and protected electrically and mechanically by the structure of the cabinet itself.

Heretofore it has been customary to employ devices for supporting cables and other electrical conductors which devices included gripping members which contacted with the insulating sheathing of such conductors. Inasmuch as there is no known insulating material for such sheathing purposes that will not eventually disintegrate, especially when gripped, then when such insulating sheathing is present as a part of the supporting means, its deterioration, whether gradual or sudden, results in serious interference with the dependability and durability of the support.

Referring to Figures 4, 5 and 6 which illustrate the fact that no enclosing cabinet is necessarily included to provide a combined connection and support for an electric conductor, whether a cable or some other kind of conductor, the insulating blocks 57 provide support for the conducting blocks 59 which latter are shaped to grip and support the conductor 50. And since the latter has a bared portion that is directly gripped by the conducting blocks, the structure as a whole provides a device which clamps and firmly holds a conductor, which conductor and also the conducting gripping members are maintained in insulated position by the non-conducting members 57. Therefore, whether the conductor 50 is a sheathed cable or not, there is no insulation intervening between the gripping members and the conductor to permit slippage from any cause.

Having now described my invention, I claim:—

1. A cabinet for electrical mechanisms, having a cable conductor, a mechanical support and an electrical connection at a single point on said conductor, the means providing for the electrical connection being entirely independent of the mechanical support.

2. A cabinet for electrical mechanisms, having a cable conductor, a frictionally gripping mechanical support and an electrical connection at a single point on said conductor, the means providing for the electrical connection being entirely independent of the mechanical support.

3. A cabinet for a series of electrical mechanisms or devices, said cabinet including bus bars and cable conductors, a mechanical support and an electrical connection for each conductor at a single point thereof, the means providing for the electrical connections being entirely independent of the mechanical supports.

4. A cabinet for electrical mechanisms, having a cable conductor, a mechanical support and an electrical connection at a single point on said conductor, said support having insulating members, and conducting members enclosed therein entirely independent of the mechanical support.

5. A cabinet for electrical mechanisms, having a cable conductor, a mechanical support and an electrical connection at a single point on said conductor, the means providing for the electrical connection being entirely independent of the mechanical support, and the said support having upwardly projecting portions of insulating material.

6. A cabinet for electrical mechanisms, having mounted therein a pair of insulating blocks, a pair of conducting blocks enclosed in the insulating blocks, said conducting blocks having portions shaped to grip an electric cable, means for causing the conducting blocks to clamp a cable, and independent means for electrically connecting the conducting blocks with electrical mechanism mounted in the cabinet.

7. A combined mechanical support and electrical connection engaging a bare conductor at one point of the latter, the means providing for the electrical connection being entirely independent of the mechanical support.

8. A combined mechanical support and electrical connection engaging a bare conductor at one point of the latter, the electrical connection being separable without disturbing the mechanical support, and the said support including an insulated mounting.

9. A combined support and electrical connection including a pair of insulating blocks, a pair of conducting blocks enclosed in the insulating blocks, said conducting blocks having portions shaped to grip an electric conductor, means for causing the conducting blocks to clamp a conductor, and independent means for electrically connecting the conducting blocks to a branch circuit.

10. An insulated combination support and current connection for a bare electric conductor, including metallic conductor-gripping members completely spaced apart to permit them to grip a conductor at a point intermediate its ends, and independently operable means for a branch connection.

11. A combined support and current connection for an electric conductor, comprising metallic members shaped and gripping opposite mid-end surfaces of a bare conductor, means for mounting the metallic members in fixed position including insulating material interposed between the metallic gripping members and the said mounting means and enclosing said gripping members.

12. The combination with an insulated electric conductor having a bared mid-end area, of a connection for said conductor including a pair of insulating blocks, and a pair of conducting blocks carried by the insulating blocks, said conducting blocks having portions shaped and lockable to grip an electric conductor.

13. The combination with an electric conductor, of a support therefor comprising gripping members contacting with a mid-end bare portion of the conductor, and non-conducting members enclosing the gripping members in an insulated position.

14. Means for maintaining an electrical conductor in operative position, comprising metallic members shaped to engage and grip opposite mid-end surfaces of a bare conductor, and insulating material enclosing the gripping members.

In testimony whereof I have affixed my signature.

JOHN W. HOOLEY.